US006865976B2

(12) United States Patent
Parks et al.

(10) Patent No.: US 6,865,976 B2
(45) Date of Patent: Mar. 15, 2005

(54) BEVEL STOP MECHANISM FOR A MITER SAW

(75) Inventors: James R. Parks, White Hall, MD (US); Brian P. Wattenbach, Columbia, MD (US); Steven A. Shull, Parkville, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/644,114

(22) Filed: Aug. 20, 2003

(65) Prior Publication Data

US 2004/0045422 A1 Mar. 11, 2004

Related U.S. Application Data

(60) Provisional application No. 60/409,772, filed on Sep. 11, 2002.

(51) Int. Cl.⁷ .............................................. B23D 45/14
(52) U.S. Cl. ....................... 83/471.3; 83/473; 83/477.1; 83/490; 83/581
(58) Field of Search ............................ 83/471.3, 477.1, 83/581, 473, 490, 564, 486.1, 432, 471.2, 468.3, 698.51, 699.51

(56) References Cited

U.S. PATENT DOCUMENTS

| | | | | | |
|---|---|---|---|---|---|
| 5,392,678 | A | * | 2/1995 | Sasaki et al. | 83/471.3 |
| 5,437,214 | A | * | 8/1995 | Sasaki et al. | 83/471.3 |
| 5,778,747 | A | * | 7/1998 | Chen | 83/471.3 |
| 5,802,943 | A | * | 9/1998 | Brunson et al. | 83/471.3 |
| 5,829,333 | A | * | 11/1998 | Itzov | 83/471.3 |
| 5,870,938 | A | * | 2/1999 | Brunson et al. | 83/471.3 |
| 5,907,987 | A | * | 6/1999 | Stumpf et al. | 83/471.3 |
| 6,032,562 | A | * | 3/2000 | Brunson et al. | 83/471.3 |
| 6,532,853 | B1 | * | 3/2003 | Kakimoto et al. | 83/471.3 |
| RE38,122 | E | * | 5/2003 | Kondo et al. | 83/471.3 |

* cited by examiner

*Primary Examiner*—Stephen Choi
(74) *Attorney, Agent, or Firm*—Adan Ayala (57) ABSTRACT

A miter saw includes a table on which a workpiece is placed, a saw assembly supporting a saw blade and having a motor for rotatably driving the saw blade, a housing pivotally supporting the saw assembly related to the table in such a manner that the saw assembly is at least laterally pivotable, and a bevel stop mechanism for selectively determining the lateral position of the saw assembly at any of a plurality of pivoted positions, the bevel stop mechanism comprising a movable rod and first, second and third fixed stop members. The table may be rotatably attached to a base.

13 Claims, 6 Drawing Sheets

BEVEL STOP MECHANISM FOR A MITER SAW

This application claims the benefit of U.S. Provisional Application No. 60/409,772, filed Sep. 11, 2002, now pending.

FIELD OF THE INVENTION

This invention relates generally to miter saws and specifically to bevel stop mechanisms for slide and/or non-sliding miter saws.

BACKGROUND OF THE INVENTION

Slide miter saws are well known in the art as they provide extended cutting range over non-sliding miter saws. Non-sliding and slide miter saws both typically have a base, a rotatable table attached to the base, a saw assembly including a motor, a blade rotatable about an axis and driven by the motor, a cover housing covering the motor, an upper blade guard covering the upper part of blade, and a lower guard pivotably attached to the upper blade guard for covering the lower part of the blade. Accordingly, the saw assembly is pivoted downwardly for cutting a workpiece disposed on the base and table.

In addition, slide miter saws enable the user to move the saw assembly horizontally along the table. Most slide miter saws accomplish this by connecting the upper blade guard (and thus the saw assembly) to a pivot arm, which in turn is connected to a trunnion, which is fixedly connected to at least one rail, which is slidably attached to a support housing connected to the table (see, e.g., U.S. Pat. No. 6,067,885). With such arrangement, the user would pull the saw assembly forwardly, move the saw assembly downwardly, then push the saw assembly rearwardly for cutting the workpiece.

Typically, the saw assembly can be pivoted about a substantially horizontal axis, i.e., the bevel axis, over a range of angles. Many miter saws can bevel between about −5° to about 50°. Other miter saws, known as double-bevel miter saws, can bevel between about −50° to about 50°.

It is desirable to provide a bevel stop mechanism to easily locate commonly used bevel angles.

SUMMARY OF THE INVENTION

In accordance with the present invention, an improved miter saw is employed. The miter saw includes a table on which a workpiece is placed, a saw assembly supporting a saw blade and having a motor for rotatably driving the saw blade, a housing pivotally supporting the saw assembly related to the table in such a manner that the saw assembly is at least laterally pivotable, and a bevel stop mechanism for selectively determining the lateral position of the saw assembly at any of a plurality of pivoted positions, the bevel stop mechanism comprising a movable rod and first, second and third fixed stop members, wherein the rod is movable between a first position where the rod can contact the first and second fixed stop members, but not the third fixed stop member, to define a first range of pivoted positions, and a second position where the rod can contact the first and third fixed stop member, but not the second fixed stop member, to define a second range of pivoted positions, wherein the first and second range of pivoted positions partially coincide, and the rod being pivotable between first and second axial positions to modify the second range of pivoted positions.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIGS. 3–5 shows the first embodiment of the bevel stop mechanism in different operating modes, where FIGS. 3A, 4A and 5A show a rod in first, second and third positions, respectively, and FIGS. 3B, 4B and 5B are partial cross-sectional views along line A—A of FIG. 1;

FIGS. 7–9 shows the second embodiment of the bevel stop mechanism in different operating modes, where FIGS. 7A, 8A and 9A show a rod in first, second and third positions, respectively, and FIGS. 7B, 8B and 9B are partial cross-sectional views along line A—A of FIG. 1;

FIGS. 12–14 shows the third embodiment of the bevel stop mechanism in different positions, where FIGS. 12A, 13A and 14A show the bevel stop mechanism in first, second and third positions, respectively, and FIGS. 12B, 13B and 14B are partial cross-sectional views along lines E—E, F—F, and G—G of FIGS. 12A, 13A and 14A, respectively; and FIGS. 15–17 shows the fourth embodiment of the bevel stop mechanism in different positions, where FIGS. 15A, 16A and 17A show the bevel stop mechanism in first, second and third positions, respectively, and FIGS. 15B, 16B and 17B are partial cross-sectional views along lines H—H, I—I, and J-J of FIGS. 15A, 16A and 17A, respectively.

DETAILED DESCRIPTION

The invention is now described with reference to the accompanying figures, wherein like numerals designate like parts. Persons skilled in the art should understand that, while the invention is being explained in terms of a slide miter saw, the invention is also applicable to non-sliding miter saws.

Referring to FIGS. 1–5, a slide miter saw 10 preferably has a base 11, a table 12 rotatably connected to the base 11, a support housing 15 pivotally connected to table 12, at least one (and preferably two) rail(s) 14 slidably connected to the support housing 15, a trunnion 13 attached to one end of the rail(s) 14, and a saw assembly 20 which comprises a pivot arm 26 pivotably attached to trunnion 13, a motor 21, a blade 22 driven by the motor 21, an upper blade guard 24 for covering an upper part of blade 22, and a lower blade guard 25 pivotally attached to the upper blade guard 24 for covering a lower part of blade 22. Preferably the motor 21 is attached to the upper blade guard 17. These elements are well known in the art. Persons skilled in the art are referred to U.S. Pat. No. 6,067,885, which is wholly incorporated by reference herein.

Figure 1:
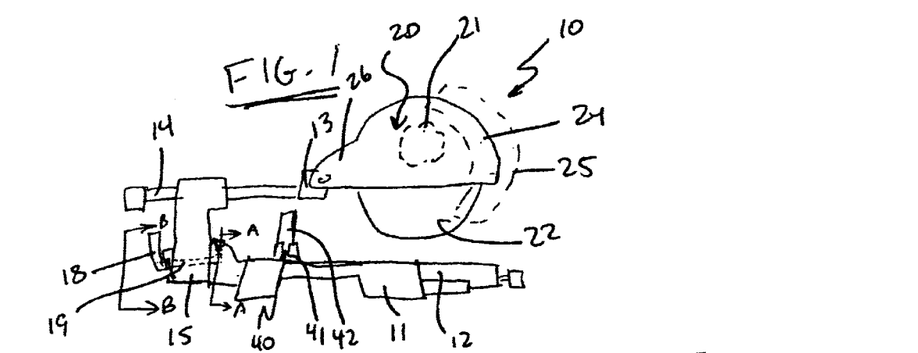
FIG. 1 is a left side view of a first miter saw according to the invention.

The slide miter saw 10 may also have a movable fence assembly 40 attached to the base 11. Movable fence assembly 40 preferably extends laterally across table 12, against which a workpiece can be positioned and supported for performing a cutting operation thereon. Movable fence assembly 40 may include a fixed fence 41 attached to base 11, and a movable fence 42 connected to the fixed fence 41. Preferably, movable fence 42 is slidably attached to fixed fence 41. Persons skilled in the art are referred to U.S. Pat. Nos. 5,297,463 and 5,943,931, which are wholly incorporated by reference herein.

Figure 2:
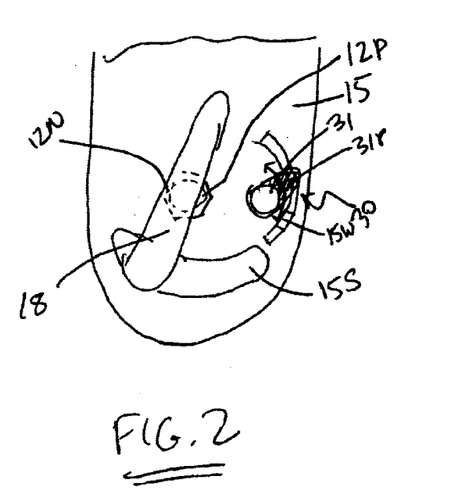
FIG. 2 is a partial rear view along line B—B of FIG. 1 of a first embodiment of the bevel stop mechanism according to the invention.

As mentioned above, the support housing 15 is pivotally connected to table 12, allowing the user to change the bevel angle. The table 12 may have a shaft 12P fixedly attached thereto that extends through support housing 15. The support housing 15 may then be sandwiched between table 12 and a nut 12N threadingly engaging shaft 12P, as is well known in the art. Persons skilled in the art will recognize that the nut 12N is disposed so as to allow, rather than prevent, the rotational movement of support housing 15.

A bevel lock mechanism is preferably provided to fix the bevel angle of saw assembly 20. The bevel lock mechanism may include a shaft 19 fixedly attached to table 12 and extending through support housing 15, and a handle 18 threadingly engaging shaft 19. The support housing 15 may then be sandwiched between table 12 and handle 18. Accordingly, the user need only to rotate the handle 18, which moves along shaft 19, fixing the bevel angle. Persons skilled in the art will recognize that shaft 19 will not be shown in FIGS. 3–5 and 7–9 for the sake of clarity.

Persons skilled in the art will recognize that, since shaft 19 is preferably fixed, support housing 15 should be provided with a slot 15S to allow support housing 15 to pivot through the entire desired range of bevel angles. Persons skilled in the art should also recognize that, while slot 15S should be wider than the portion shaft 19 extending through support housing 15, it should be narrower than the portion of handle 18 which contacts and locks support housing 15.

In addition, miter saw 10 is preferably provided with a bevel stop mechanism 30. Bevel stop mechanism 30 preferably includes a stop rod 31 and three stop bosses 32, 33, 34. Stop rod 31 is preferably slidably disposed within support housing 15, so that it can move along its longitudinal axis. In addition, stop rod 31 may be rotatable about its longitudinal axis.

Figure 3A:
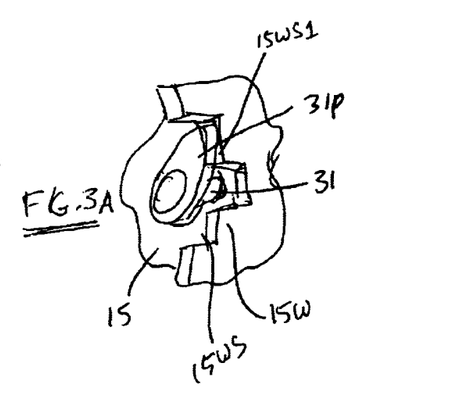
Figure 3B:
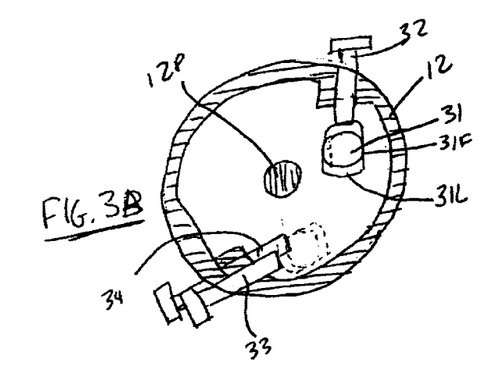

As shown in FIG. 3B, stop rod 31 may have projections or lobes 31L which preferably extend along an axis substantially perpendicular to the longitudinal axis of stop rod 31. In addition, stop rod 31 may have flat sides 31F disposed transversely of the lobes 31L.

Stop rod 31 may have a positioner 31P attached thereto for selecting the rotational position of stop rod 31, as will be discussed more fully below. Positioner 31P may also shaped in an ergonomic shape to allow the user to use positioner 31P as a handle, enabling the user to move stop rod 31 to the different positions. Persons skilled in the art will recognize that positioner 31P may be integral and/or unitary with stop rod 31.

Support housing 15 may also have a wall 15W for engaging positioner 31P. Preferably, wall 15W have steps 15WS that contact positioner 31P when the positioner is placed in several different desirable positions. Persons skilled in the art will recognize that the steps 15WS in effect assist the user in finding those desirable positions.

Preferably, table 12 has three stop bosses 32, 33, 34. Stop bosses 32, 33 may be subtantially coplanar, while stop boss 34 is disposed farther away from support housing 15 than stop bosses 32, 33.

Figure 4B:
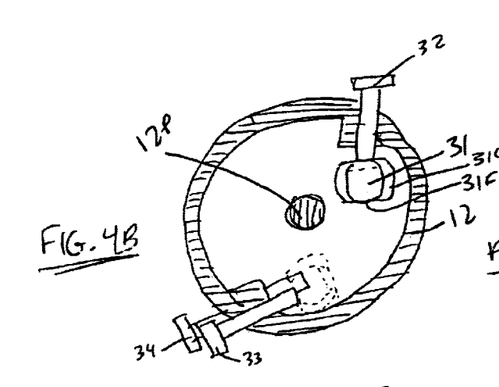
Figure 5A:
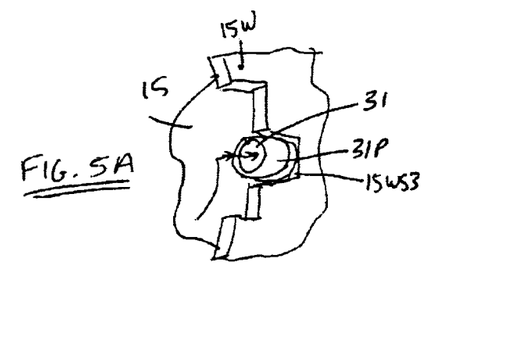

As shown in FIGS. 3A, 4A and 5A, positioner 31P (and thus stop rod 31) can be disposed in three main positions: (a) a first position; (b) a second pivoted position; and (c) a third plunged position, respectively.

Referring to FIG. 3, positioner 31P is placed onto step 15WS1 and into the first position. In this position, stop rod 31 extends out of support housing 15 and into table 12 assembly such that it can contact either stop boss 32 or 33. However, stop rod 31 is not long enough to extend further enough into table 12 to contact stop boss 34.

Preferably, the positions of stop bosses 32, 33 are selected to define a first bevel angle range, having limits at the points where the lobes 31L of stop rod 31 contact the stop bosses 32, 33. For example, stop bosses 32, 33 can be used to define a bevel angle range starting at 0° and ending at 45°. Accordingly, as support housing 15 is pivoted in the counterclockwise direction, stop rod 31 moves towards stop boss 32. When stop rod 31 contacts stop boss 32, the saw assembly 20 is at the 0° bevel angle. Similarly, as support housing 15 is pivoted in the clockwise direction, stop rod 31 moves towards stop boss 33. When stop rod 31 contacts stop boss 33, the saw assembly 20 is at the 45° bevel angle. The user can then fix the bevel angle by rotating handle 18.

Persons skilled in the art will recognize that other bevel angle ranges can be defined by positioning stop bosses 32, 33 at other positions. For example, stop bosses 32, 33 can define a bevel angle range starting at −45° and ending at 45°, etc.

Preferably, the ends of stop bosses 32, 33 contact stop rod 31. In addition, the longitudinal axes of stop bosses 32 and/or 33 are preferably substantially perpendicular to the longitudinal axis of stop rod 31. However, persons skilled in the art will recognize that the longitudinal axes of stop bosses 32 and/or 33 may be alternatively angled relative to the longitudinal axis of stop rod 31.

Figure 4D:
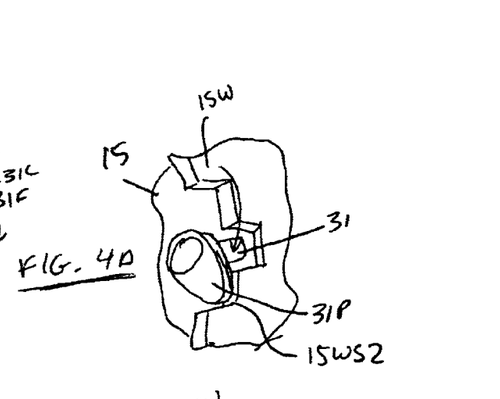

Referring to FIG. 4, positioner 31P is rotated clockwise from the first position onto step 15WS2 and into the second position. In this position, stop rod 31 extends out of support housing 15 and into table 12 assembly such that it can contact either stop boss 32 or 33. However, stop rod 31 is not long enough to extend further enough into table 12 to contact stop boss 34.

In other words, stop rod 31 may just be rotated about its longitudinal axis. Preferably, stop rod 31 is rotated enough so that flat sides 31F, rather than lobes 31L, contact stop bosses 32, 33. In the arrangement described above, stop rod 31 could be rotated about 90° from the first position to the second position.

Because the diameter of stop rod 31 is effectively changed, the bevel angle range defined by stop bosses 32, 33 is also changed without having to change the positions of stop bosses 32, 33. For example, instead of defining a bevel angle range starting at 0° and ending at 45°, stop bosses 32, 33 may define a bevel angle range starting at −3° and ending at 48°, etc.

The difference is of course dependent upon the width differential of stop rod 31. Persons skilled in the art will know to select the widths of stop rod 31 dependent upon the desired bevel angle range differential, i.e., whether the angle different should be 3° or 5°, etc. Persons skilled in the art will also recognize that the widths can be selected so that the angle differential at each end of the bevel angle range is different. For example, the widths can be selected so that the first bevel angle range is 0°–45°, whereas the expanded bevel angle range is −3° to 50°. In other words, the respective differential is 3° and 5° at the ends defined by stop bosses 32, 33, respectively.

Figure 5B:
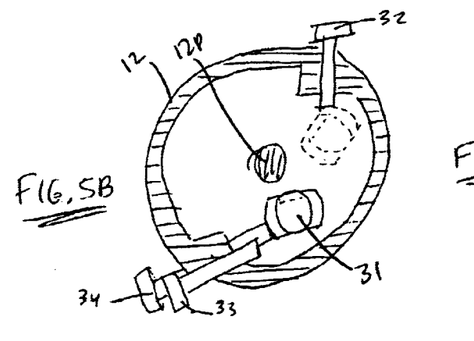
Figure 6:
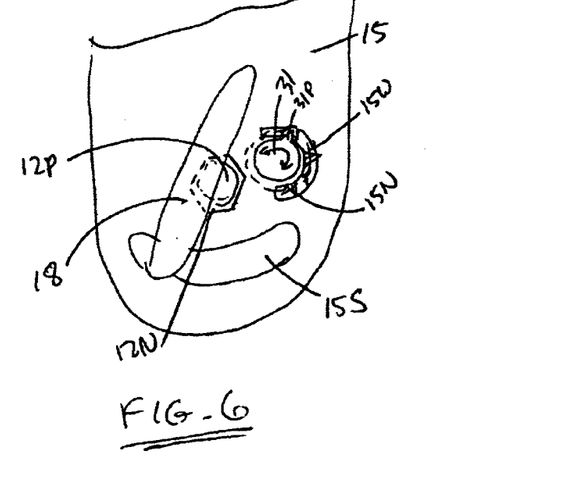
FIG. 6 is a partial rear view along line B—B of FIG. 1 of a second embodiment of the bevel stop mechanism according to the invention.
Figure 7A:
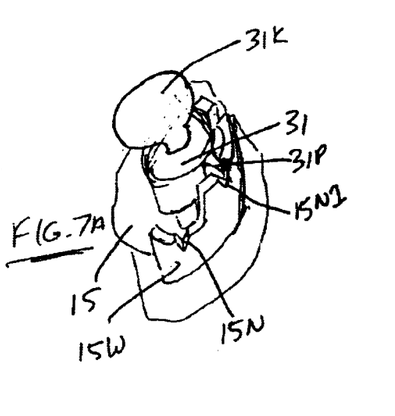
Figure 7B:
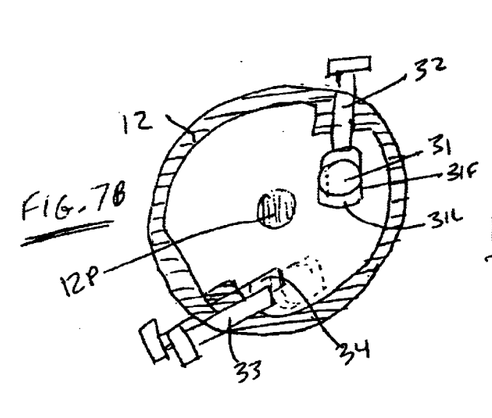

Referring to FIG. 5, positioner 31P is rotated counter-clockwise from the second position and plunged onto step 15WS3 and into the third position. In this position, stop rod 31 extends out of support housing 15 and into table 12 assembly such that it can contact either stop boss 32 or 34. However, because of the position of stop boss 34, stop rod 31 will not to contact stop boss 33.

In other words, stop rod 31 may be rotated about its longitudinal axis and slid along its longitudinal axis. Preferably, stop rod 31 is rotated enough so that lobes 31L, rather than flat sides 31F, contact stop bosses 32, 34. In the arrangement described above, stop rod 31 could be rotated about 45° from the first position to the second position.

Preferably, the positions of stop bosses 32, 34 are selected to define a second bevel angle range, having limits at the points where the lobes 31L of stop rod 31 contact the stop bosses 32, 34. For example, stop bosses 32, 33 can be used to define a bevel angle range starting at 0° and ending at 33.85°, a common crown-molding cutting position. Alternatively, stop bosses 32, 34 can define a bevel angle range starting at −45° and ending at 0°, where stop boss 33 defines 45°.

Preferably, the end of stop boss 34 contacts stop rod 31. In addition, the longitudinal axis of stop boss 34 is preferably substantially perpendicular to the longitudinal axis of stop rod 31. However, persons skilled in the art will recognize that the longitudinal axis of stop boss 34 may be alternatively angled relative to the longitudinal axis of stop rod 31.

In addition, step 15WS3 may be shaped or dimensioned so that stop rod 31 cannot be rotated when in the plunged position.

Preferably, stop bosses 32–34 are bolts that threadingly engage table 12, and may be adjustable. The adjustability of each stop boss 32–34 is provided by the threaded connection between the bolts and table 12. This adjustability allows the user to accurately set specific bevel angles.

A spring (not shown) may be disposed between the housing 15 and stop rod 31 for biasing stop rod 31 towards the plunged position of FIG. 5. Persons skilled in the art will recognize that, while stop rod 31 is biased towards the plunged position, steps 15WS1, 15WS2 will prevent stop rod 31 from moving into the plunged position.

The spring may be a compression spring. Persons skilled in the art will recognize that other means, such as elastomeric materials and structures, can be utilized to bias the stop rod 31 into the plunged position.

In addition, persons skilled in the art should recognize that the stop rod 31 may be disposed on table 12, while the stop bosses 32–34 may be disposed on the support housing 15.

It may be preferable to provide stop rod 31 with a protrusion (not shown) to prevent the user from pulling stop rod 31 out of support housing 31, or from pulling stop rod 31 enough to avoid contact with stop bosses 32, 33.

A second embodiment of bevel stop mechanism 30 is shown in FIGS. 6–9, wherein like numerals designate like parts. The teachings of the previous embodiment are wholly incorporated herein.

One of the differences between the first and second embodiments is that stop rod 31 may have a knob 31K separate from positioner 31P for moving stop rod 31. Persons skilled in the art will recognize that positioner 31P and/or knob 31K may be integral and/or unitary with stop rod 31.

Figure 8A:
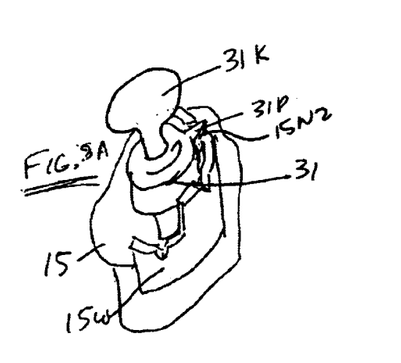
Figure 8B:
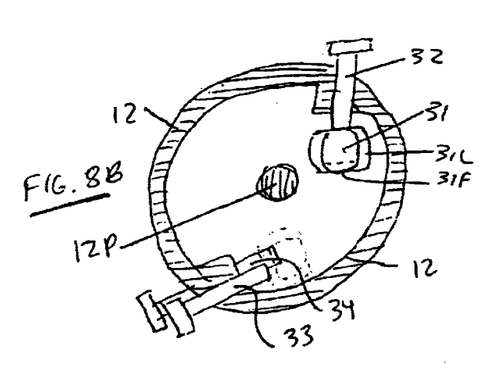
Figure 9A:
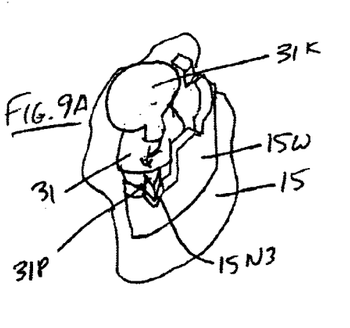
Figure 9B:
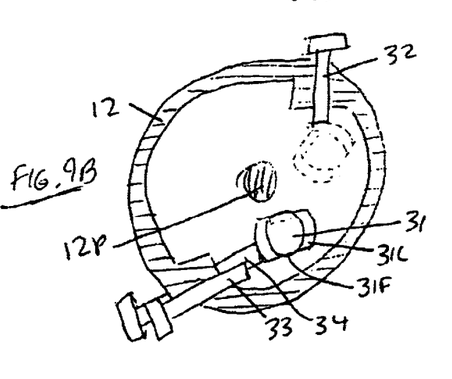
Figure 10:
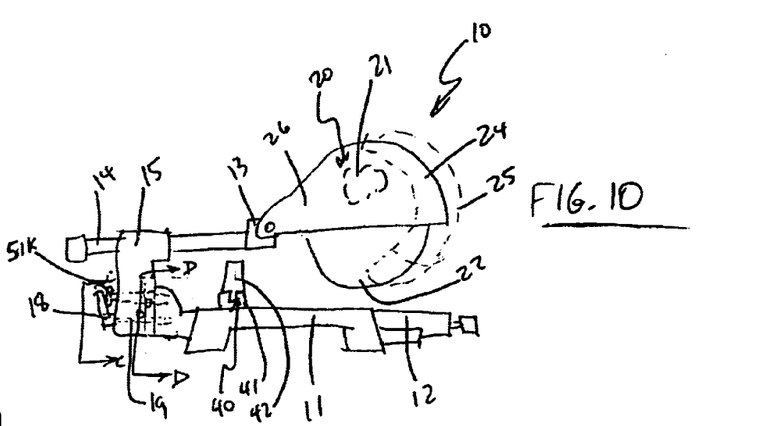
FIG. 10 is a left side view of a second miter saw according to the invention.

Another difference between the first and second embodiments is that positioner 31P engages notches 15N in wall 15W for selecting the rotational position of stop rod 31. The notches 15N are disposed in such manner to obtain the desired rotational positions. For example, referring to FIG. 7, positioner 31P is placed onto notch 15N1 and into the first position equivalent to the first position shown in FIG. 3. Referring to FIG. 8, positioner 31P is rotated counter-clockwise from the first position onto notch 15N2 and into the second position equivalent to the second position shown in FIG. 4. Referring to FIG. 9, positioner 31P is rotated clockwise from the second position and plunged onto notch 15N3 and into the third position. Other than these differences, the first and second embodiments function in the same manner.

A third embodiment of a bevel stop mechanism is shown in FIGS. 10–14, wherein like numerals designate like parts. The teachings of the previous embodiments are wholly incorporated herein.

Figure 11:
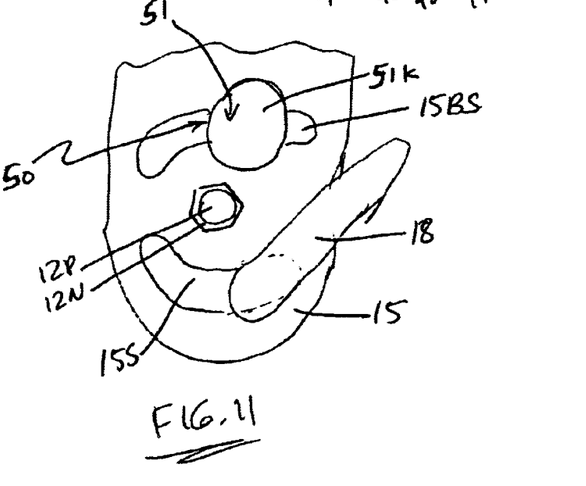
FIG. 11 is a partial rear view along line C–CB of FIG. 11 of a third and fourth embodiments of the bevel stop mechanism according to the invention.

Miter saw 10 is preferably provided with a bevel stop mechanism 50. Bevel stop mechanism 50 preferably includes a stop rod 51 with a fixed shaft 51F fixedly attached to table 12, and a movable sleeve 51M slidably attached to fixed shaft 51F. Stop rod 51 may also have a knob 51K for manipulating the movement of sleeve 51M.

Persons skilled in the art will recognize that, since fixed shaft 51F is fixed, support housing 15 should be provided with a slot 15BS to allow support housing 15 to pivot through the entire desired range of bevel angles.

Figure 12A:
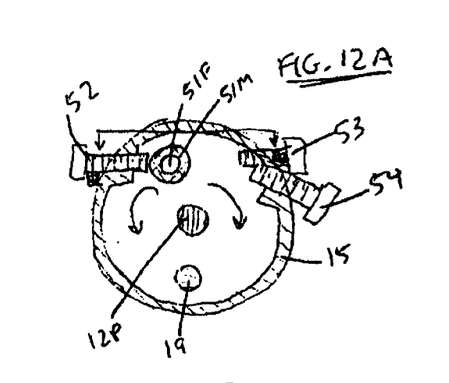
Figure 12B:
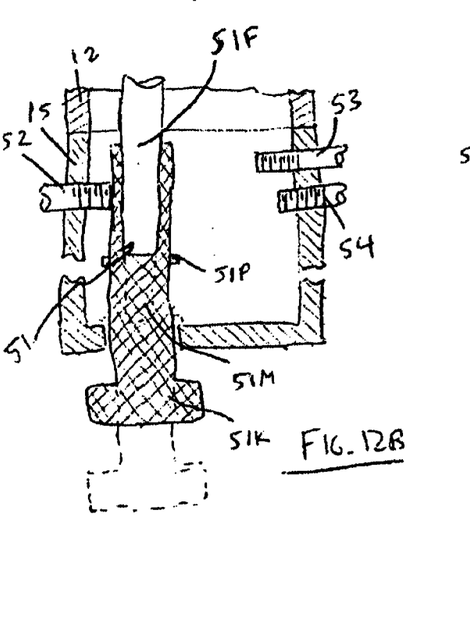

As shown in FIG. 12B, sleeve 51M extends through support housing 15. In addition, sleeve 51M maybe moved outwardly. Sleeve 51M may have projections 51P to prevent the user to pull sleeve 51M off fixed shaft 51F and completely out of support housing 15.

In addition, bevel stop mechanism 50 may have three stop bosses 52, 53, 54 disposed on support housing 15. As before, the positions where stop rod 51 contacts stop bosses 52–54 define the bevel angle of saw assembly 20.

Figure 13A:
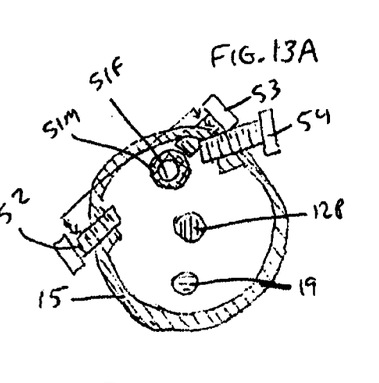
Figures 13B, 14B:
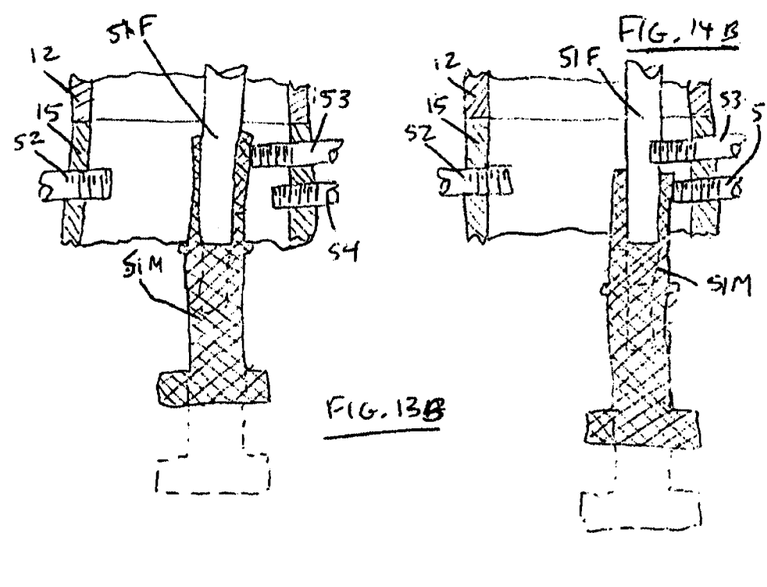

As shown in FIG. 12, fixed shaft 51F is preferably fully nested within sleeve 51M. In other words, sleeve 51M is in a plunged position. If support housing 15 is moved clockwise, stop boss 52 would contact sleeve 51M. Similarly, if support housing 15 is moved counter-clockwise while sleeve 51M is in the plunged position, stop boss 53 would contact sleeve 51M as shown in FIG. 13.

Preferably, the positions of stop bosses 52, 53 are selected to define a first bevel angle range, having limits at the points where sleeve 51M contact the stop bosses 52, 53. For example, stop bosses 52, 53 can be used to define a bevel angle range starting at 0° and ending at 33.85°, a common crown-molding cutting position. Accordingly, as support housing 15 is pivoted in the clockwise direction, stop boss 52 moves towards stop rod 51. When sleeve 51M contacts stop boss 52, the saw assembly 20 is at the 0° bevel angle. Similarly, as support housing 15 is pivoted in the counter-clockwise direction, stop boss 53 moves towards stop rod 51. When sleeve 51M contacts stop boss 53, the saw assembly 20 is at the 33.85° bevel angle. The user can then fix the bevel angle by rotating handle 18.

Persons skilled in the art will recognize that other bevel angle ranges can be defined by positioning stop bosses 52, 53 at other positions. For example, stop bosses 52, 53 can define a bevel angle range starting at −45° and ending at 0°, etc.

Preferably, the ends of stop bosses 52, 53 contact stop rod 51. In addition, the longitudinal axes of stop bosses 52 and/or 53 are preferably substantially perpendicular to the longitudinal axis of stop rod 51. However, persons skilled in the art will recognize that the longitudinal axes of stop bosses 52 and/or 53 may be alternatively angled relative to the longitudinal axis of stop rod 51.

Figure 14A:
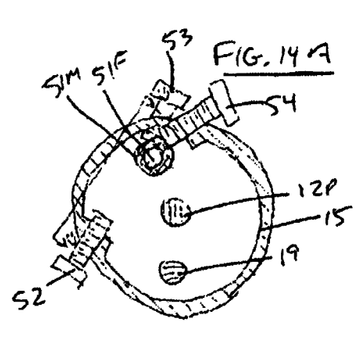

If the user wants to move to a bevel angle beyond the stop boss 53, the user need only slide sleeve 51M along its longitudinal axis, i.e., pull out sleeve 51M. Because the user has effectively reduced the diameter of stop rod 51, support housing 15 can be further moved in the counter-clockwise direction, until stop boss 54 contacts sleeve 51M.

Preferably, the positions of stop bosses 52, 54 are selected to define a second bevel angle range, having limits at the points where the stop rod 51 contact the stop bosses 52, 54. For example, stop bosses 52, 54 can be used to define a bevel angle range starting at 0° and ending at 45°. Alternatively, stop bosses 52, 54 can define a bevel angle range starting at −45° and ending at 45°, where stop boss 53 defines 0°.

Preferably, the end of stop boss 54 contacts stop rod 51. In addition, the longitudinal axis of stop boss 54 is preferably substantially perpendicular to the longitudinal axis of stop rod 51. However, persons skilled in the art will recognize that the longitudinal axis of stop boss 54 may be alternatively angled relative to the longitudinal axis of stop rod 51.

Persons skilled in the art will recognize that stop bosses 52, 54 may be substantially coplanar, whereas stop boss 53 will be disposed closer to table 12 than stop bosses 52, 54.

Persons skilled in the art will recognize that in the embodiment shown in FIGS. 12–14, sleeve 51M is dimensioned so that it cannot avoid contact with stop bosses 52, 54. In other words, stop bosses 52, 54 cannot be bypassed. This is because projections 51P limit the travel range of sleeve 51M along its longitudinal axis so that sleeve 51M cannot slide out enough to bypass stop bosses 52, 54. However, persons skilled in the art should recognize that the travel range of sleeve 51M can be adjusted by changing the location of projections 51P so that sleeve 51M can slide out enough to bypass stop bosses 52, 54. This would in effect increase the breadth of the second bevel angle range.

Preferably, stop bosses 52–54 are bolts that threadingly engage support housing 15, and may be adjustable. The adjustability of each stop boss 52–54 is provided by the threaded connection between the bolts and support housing 15. This adjustability allows the user to accurately set specific bevel angles.

Figures 15A, 15B, 16A, 16B:
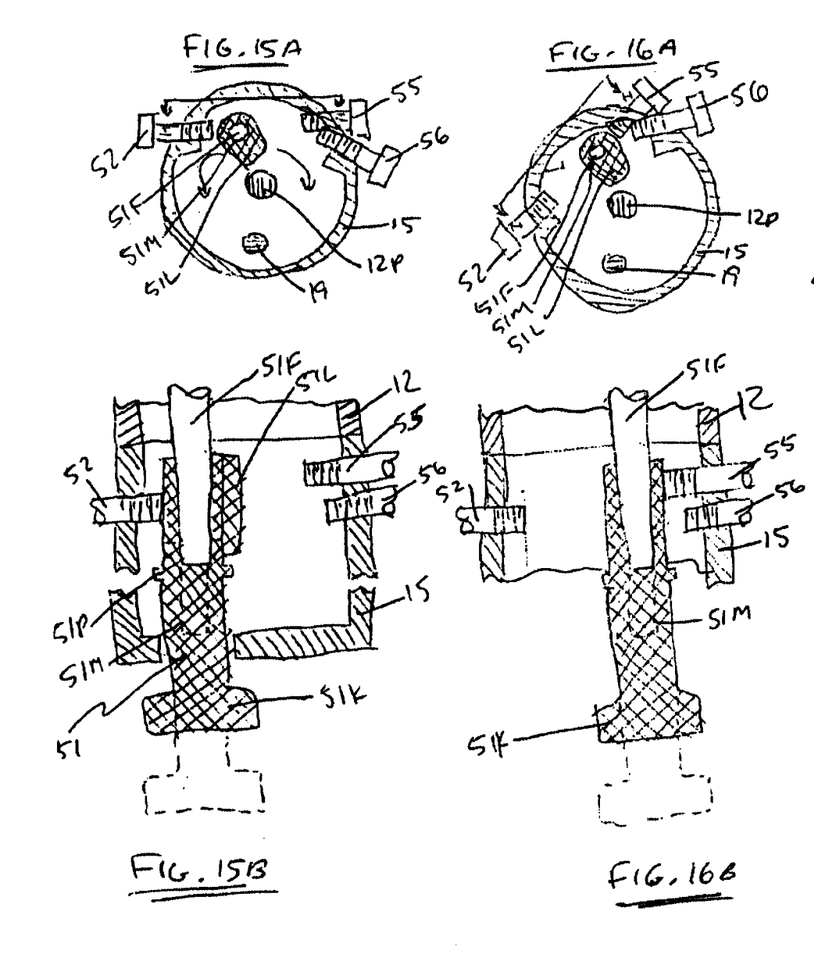
Figure 17A:
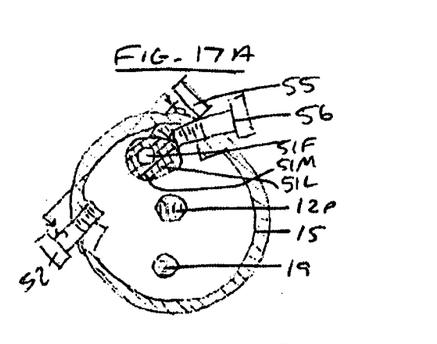
Figure 17B:
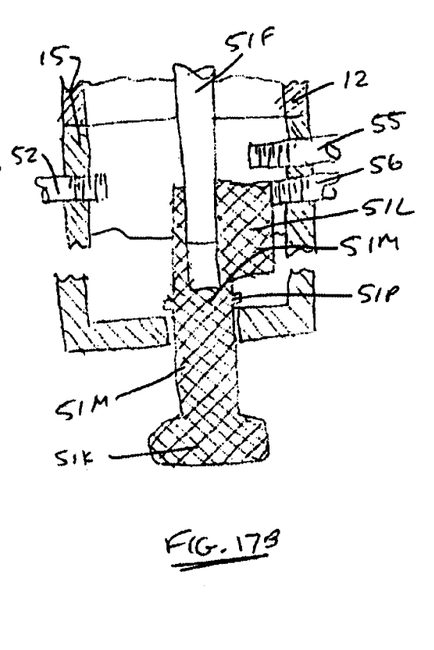

Another embodiment of bevel stop mechanism 50 is shown in FIGS. 15–17, wherein like numerals designate like parts. The teachings of the previous embodiments are wholly incorporated herein.

One of the differences between the present and third embodiments is that stop bosses 52, 55 may be closer to table 12 than stop boss 56. In addition, stop bosses 52, 55 may define the extremes of the bevel angle range, whereas stop boss 56 defines a bevel angle within this bevel angle range.

For example, stop bosses 52, 55 can be used to define a bevel angle range starting at 0° and ending at 45°, as shown in FIGS. 15–16. Accordingly, as support housing 15 is pivoted in the clockwise direction, stop boss 52 moves towards stop rod 51. When sleeve 51M contacts stop boss 52, the saw assembly 20 is at the 0° bevel angle. Similarly, as support housing 15 is pivoted in the counter-clockwise direction, stop boss 55 moves towards stop rod 51. When sleeve 51M contacts stop boss 55, the saw assembly 20 is at the 45° bevel angle. The user can then fix the bevel angle by rotating handle 18. As before, other bevel angle ranges can be defined by positioning stop bosses 52, 55 at other positions. For example, stop bosses 52, 53 can define a bevel angle range starting at −45° and ending at 45°, etc.

If the user wants to move to a bevel angle beyond the stop boss 55, the user need only slide sleeve 51M along its longitudinal axis, i.e., pull out sleeve 51M. Because the user has effectively reduced the diameter of stop rod 51, support housing 15 can be further moved, until stop boss 55 contacts fixed shaft 51F.

The user can select a second bevel range defined by stop bosses 52, 56 by slide sleeve 51M along its longitudinal axis, i.e., pull out sleeve 51M, and rotating sleeve 51M about its longitudinal axis, as shown in FIG. 17. This places a lobe or protrusion 51L disposed on sleeve 51M in position to contact stop boss 56 before fixed shaft 51F contacts stop boss 55. Preferably, the positions of stop bosses 52, 56 are selected to define a second bevel angle range, having limits at the points where the sleeve 51M contact the stop bosses 52, 56. For example, stop bosses 52, 56 can be used to define a bevel angle range starting at 0° and ending at 33.85°, a common crown-molding cutting position. Alternatively, stop bosses 52, 56 can define a bevel angle range starting at −45° and ending at 0°, where stop boss 55 defines 45°.

Preferably, the ends of stop bosses 55, 56 contact stop rod 51. In addition, the longitudinal axes of stop bosses 55 and/or 56 are preferably substantially perpendicular to the longitudinal axis of stop rod 51. However, persons skilled in the art will recognize that the longitudinal axes of stop bosses 55 and/or 56 may be alternatively angled relative to the longitudinal axis of stop rod 51.

In addition, stop bosses 55, 56 may be bolts that threadingly engage support housing 15, and may be adjustable. The adjustability of each stop boss 55, 56 is provided by the threaded connection between the bolts and support housing 15. This adjustability allows the user to accurately set specific bevel angles.

Persons skilled in the art may recognize other additions or alternatives to the means disclosed herein. However, all these additions and/or alterations are considered to be equivalents of the present invention.

What is claimed is:

1. A miter saw comprising:
   a table on which a workpiece is placed;
   a saw assembly supporting a saw blade and having a motor for rotatably driving the saw blade;
   a housing pivotally supporting the saw assembly related to the table in such a manner that the saw assembly is at least laterally pivotable; and
   a bevel stop mechanism for selectively determining the lateral position of the saw assembly at any of a plurality of pivoted positions, the bevel stop mechanism comprising a movable rod and first, second and third fixed stop members,
   wherein the rod is movable between a first position where the rod can contact the first and second fixed stop members, but not the third fixed stop member, to define a first range of pivoted positions, and a second position where the rod can contact the first and third fixed stop member, but not the second fixed stop member, to define a second range of pivoted positions,
   wherein the first and second range of pivoted positions partially coincide, and the rod being pivotable between first and second axial positions to modify the second range of pivoted positions.

2. The miter saw of claim 1, wherein the first fixed stop member is disposed so that the rod abuts said first fixed stop member when the miter saw unit is at the vertical position.

3. The miter saw of claim 2, wherein said movable rod rotates between said first and second rod positions about a rotational axis parallel to the axis about which said miter saw unit laterally pivots.

4. The miter saw of claim 1, further comprising a base rotatably supporting the table.

5. The miter saw of claim 1, wherein said movable rod is mounted on the housing and said fixed stop members are mounted on said table.

6. The miter saw of claim 1, wherein the housing further comprises a wall for normally maintaining the movable rod at said second rod position.

7. The miter saw of claim 1, wherein the first fixed stop members is a bolt.

8. The miter saw of claim 7, wherein said bolt abuts said rod so that an axis of said bolt is positioned perpendicular to an axis of the rod.

9. The miter saw of claim 1, wherein the housing vertically pivotally supports said miter saw unit.

10. The miter saw of claim 1, wherein said movable rod is mounted on the table and said fixed stop members are mounted on said housing.

11. The miter saw of claim 10, wherein said movable rod is movable between said first and second rod positions along its longitudinal axis.

12. The miter saw of claim 1, wherein a positioner is attached to the movable rod.

13. The miter saw of claim 1, wherein a handle is attached to the movable rod.

* * * * *